United States Patent
Tokura et al.

(10) Patent No.: US 9,005,080 B1
(45) Date of Patent: Apr. 14, 2015

(54) CONTROL DEVICE FOR VEHICLE DRIVE DEVICE

(75) Inventors: Takaaki Tokura, Nagoya (JP); Masato Kaigawa, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 14/358,756

(22) PCT Filed: Nov. 18, 2011

(86) PCT No.: PCT/JP2011/076725
§ 371 (c)(1),
(2), (4) Date: May 16, 2014

(87) PCT Pub. No.: WO2013/073057
PCT Pub. Date: May 23, 2013

(51) Int. Cl.
| | |
|---|---|
| *F02D 23/00* | (2006.01) |
| *B60W 30/188* | (2012.01) |
| *B60W 10/11* | (2012.01) |
| *B60W 10/06* | (2006.01) |

(52) U.S. Cl.
CPC ........... *B60W 30/1882* (2013.01); *B60W 10/11* (2013.01); *B60W 10/06* (2013.01)

(58) Field of Classification Search
None
See application file for complete search history.

(56) References Cited

U.S. PATENT DOCUMENTS

| | | | | |
|---|---|---|---|---|
| 4,589,302 | A * | 5/1986 | Oda et al. | 477/32 |
| 5,205,191 | A * | 4/1993 | Takata et al. | 477/33 |
| 5,499,953 | A * | 3/1996 | Hayasaki | 477/120 |
| 5,580,329 | A * | 12/1996 | Hayashi | 477/33 |
| 8,241,177 | B2 * | 8/2012 | Doering et al. | 477/33 |

FOREIGN PATENT DOCUMENTS

| | | | |
|---|---|---|---|
| EP | 1 279 813 A2 | 1/2003 | |
| JP | 7-156693 A | 6/1995 | |
| JP | 2003-39989 A | 2/2003 | |
| JP | 2007-62459 A | 3/2007 | |
| WO | WO 2013121510 A1 * | 2/2012 | ............. F02D 29/00 |

* cited by examiner

*Primary Examiner* — Dirk Wright
(74) *Attorney, Agent, or Firm* — Sughrue Mion, PLLC

(57) ABSTRACT

A control device for a drive device of a vehicle which is provided with an engine, a supercharger to raise a pressure of intake air introduced in said engine, an accelerating member manually operable by an operator of the vehicle to accelerate the vehicle, and an automatic transmission constituting a portion of a power transmitting path between said engine and drive wheels, and wherein said engine is placed in a first operating state in which said supercharger is operated, or a second operating state in which an operation of said supercharger is restricted as compared with that in said first operating state, said control device comprising: a speed ratio selection control portion configured to implement a speed ratio selection control to change a method of selecting a speed ratio of said automatic transmission depending upon a rate of increase of an operation amount of said accelerating member, where said engine will be placed in said first operating state if said automatic transmission is shifted to select a first speed ratio value according to a predetermined shifting map while said engine is placed in said second operating state, said speed ratio selection control portion implementing said speed ratio selection control to shift said automatic transmission to select said first speed ratio value when the rate of increase of the operation amount of said accelerating member is relatively low, and to shift said automatic transmission to select a second speed ratio value at which said engine is kept in said second operating state and which is higher than said first speed ratio value, when the rate of increase of the operation amount of said accelerating member is relatively high.

6 Claims, 4 Drawing Sheets

CONTROL DEVICE FOR VEHICLE DRIVE DEVICE

CROSS REFERENCE TO RELATED APPLICATIONS

This application is a National Stage of International Application No. PCT/JP2011/076725 filed Nov. 18, 2011, the contents of which are incorporated herein by reference in their entirety.

TECHNICAL FIELD

The present invention relates to techniques for improving a response of a vehicle to an operator's operation to accelerate the vehicle.

BACKGROUND ART

There is known a vehicle provided with an engine, a supercharger to raise the pressure of intake air introduced in the engine, and an automatic transmission constituting a portion of a power transmitting path between the engine and drive wheels. Patent Document 1 discloses a control device for a vehicular drive system used for this type of vehicle. In the vehicular drive system disclosed in Patent Document 1, the automatic transmission is a continuously variable transmission the speed ratio of which is continuously variable. The control device of Patent Document 1 is configured to control shifting actions of the automatic transmission such that a rate of change of the speed ratio (shifting speed) of the automatic transmission in an initial stage of a shifting action is made higher when a rate of change of an operation amount of an accelerator pedal, namely, a rate of increase of the accelerator pedal operation amount is higher than a predetermined value, than when the rate of increase is not higher than the predetermined value. This manner of control of the shifting actions permits a rapid rise of the intake air by the supercharger upon an operation of the accelerator pedal by the vehicle operator to accelerate the vehicle, thereby improving a response of the vehicle to the vehicle operator's operation to accelerate the vehicle.

PRIOR ART DOCUMENTS

Patent Documents

Patent Document 1: JP-2003-039989 A
Patent Document 2: JP-7-156693 A
Patent Document 3: JP-2007-062459 A

SUMMARY OF THE INVENTION

Object Achieved by the Invention

The above-described control device of Patent Document 1 has some recognized effect to improve the response of the vehicle to the vehicle operator's operation to accelerate the vehicle. The response of the vehicle may be insufficient to meet a degree of acceleration of the vehicle expected by the vehicle operator, depending upon the operating condition of the supercharger immediately after the vehicle operator's operation to accelerate the vehicle, or the rate of increase of the amount of operation of the accelerator pedal by the vehicle operator to accelerate the vehicle. Such object is an unknown object.

The present invention was made in view of the background art described above. It is therefore an object of the present invention to provide a control device for a vehicular drive system of a vehicle provided with the above-indicated engine, supercharger and automatic transmission, which permits an improvement of a response of the vehicle to a vehicle operator's operation to accelerate the vehicle.

Means for Achieving the Object

The object indicated above is achieved according to a first aspect of the present invention, which provides a control device for (a) a drive device of a vehicle which is provided with an engine, a supercharger to raise a pressure of intake air introduced in the above-described engine, and an automatic transmission constituting a portion of a power transmitting path between the above-described engine and drive wheels, and wherein the above-described engine is placed in a first operating state in which the above-described supercharger is operated, or a second operating state in which an operation of the above-described supercharger is restricted as compared with that in the above-described first operating state, the above-described control device being characterized by comprising (b) implementing a speed ratio selection control to change a method of selecting a speed ratio of the above-described automatic transmission depending upon a rate of increase of an operation amount of an accelerator pedal, where the above-described engine will be placed in the above-described first operating state if the above-described automatic transmission is shifted to select a first speed ratio value according to a predetermined shifting map while the above-described engine is placed in the above-described second operating state, (c) the above-described speed ratio selection control being implemented to shift the above-described automatic transmission to select the above-described first speed ratio value when the rate of increase of the operation amount of the above-described accelerator pedal is relatively low, and to shift the above-described automatic transmission to select a second speed ratio value at which the above-described engine is kept in the above-described second operating state and which is higher than the above-described first speed ratio value, when the rate of increase of the operation amount of the above-described accelerator pedal is relatively high.

Advantages of the Invention

A degree of delay of an operating response of the above-described engine as recognized by an operator of the vehicle upon switching of the engine from the above-described second operating state to the above-described first operating state increases with an increase of the rate of increase of the operation amount of the above-described accelerator pedal. According to the above-described first aspect of the present invention, however, the above-described speed ratio selection control is implemented such that when the rate of increase of the operation amount of the above-described accelerator pedal is relatively high while the above-described engine is placed in the above-described second operating state, a drive force to drive the vehicle is obtained according to the operation of the accelerator pedal, owing to the shifting action of the above-described automatic transmission to select the above-described second speed ratio value with the above-described engine being kept in the above-described second operating state, and owing to a rise of the operating speed of the engine. Accordingly, the response of the vehicle to an operation by the vehicle operator to accelerate the vehicle can be improved as compared in the case where the above-described automatic transmission is shifted according to the above-described shifting map, to immediately select the above-described first speed ratio value. Namely, the drivability of the vehicle can be improved.

According to a second aspect of the invention, the control device according to the first aspect of the invention is characterized in that (a) the above-described speed ratio selection control is implemented such that the above-described automatic transmission which has been shifted to select the above-described second speed ratio value is shifted to select the above-described first speed ratio value after shifting of the automatic transmission to the second speed ratio value, and (b) the above-described engine is switched from the above-described second operating state to the above-described first operating state after a moment of completion of a shifting action of the above-described automatic transmission to select the above-described second speed ratio value and before a moment of initiation of a shifting action of the automatic transmission from said second speed ratio value to select the above-described first speed ratio value. According to this second aspect of the invention, it is possible to shift the above-described automatic transmission to select the speed ratio value according to the above-described shifting map, that is, to select the above-described first speed ratio value, while reducing the degree of delay of an operating response of the above-described supercharger as recognized by the vehicle operator.

According to a third aspect of the invention, the control device according to the first or second aspect of the invention is characterized in that the above-described speed ratio selection control is implemented such that the above-described automatic transmission which has been shifted to select the above-described second speed ratio value is shifted to select the above-described first speed ratio value after a predetermined waiting time has expired from a moment of completion of a shifting action of the above-described automatic transmission to select the above-described second speed ratio value. According to this third aspect of the invention, the above-described automatic transmission is only temporarily placed in a speed position having the above-described second speed ratio value, and is eventually shifted to a speed position according to the above-described shifting map, making it possible to assure fuel economy of the vehicle almost equal to that in the case of the normal shifting action according to the shifting map. It is noted that the "fuel economy" is represented by a running distance of the vehicle per unit amount of consumption of a fuel, for instance, and that an improvement of the fuel economy means an increase of the vehicle running distance per unit amount of consumption of the fuel, or a decrease of an overall fuel consumption ratio of the vehicle (=fuel consumption amount/output of the drive wheels). Conversely, reduction (deterioration) of the fuel economy means a decease of the vehicle running distance per unit amount of consumption of the fuel, or an increase of the overall fuel consumption ratio.

According to a fourth aspect of the invention, the control device according to any one of the first through third aspects of the invention is characterized in that (a) the above-described automatic transmission is a step-variable transmission, and (b) a speed position of the above-described automatic transmission which has the above-described second speed ratio value is a highest-gear position of speed positions in which the above-described engine is kept in the above-described second operating state. According to this fourth aspect of the invention, it is possible to minimize a possibility that the vehicle operator feels uneasy about a shifting action of the above-described automatic transmission to temporarily select the above-described second speed ratio value.

According to a fifth aspect of the invention, the control device according to the second or third aspect of the invention is characterized in that (a) the above-described vehicle is provided with an engine operation switching device configured to switch the above-described engine between the above-described first operating state and the above-described second operating state, (b) a predetermined engine operation map is provided such that the engine operation map is divided into a first operating region in which the above-described engine is placed in the above-described first operating state and a second operating region in which the above-described engine is placed in the above-described second operating state, and (c) the above-described speed ratio selection control is implemented such that when the above-described automatic transmission which has been shifted to select the above-described second speed ratio value is shifted to select the above-described first speed ratio value, the above-described engine is switched to the above-described first operating state by the above-described engine operation switching device before an operating point of the above-described engine in the above-described engine operation map has moved from the above-described second operating region into the above-described first operating region. According to this fifth aspect of the invention, the pressure of the intake air is raised by the above-described supercharger before a moment of completion of the shifting action to select the above-described first speed ratio value after selection of the above-described second speed ratio value, so that the operating response of the above-described engine can be improved.

According to a sixth aspect of the invention, the control device according to any one of the first through fifth aspects of the invention is characterized in that the above-described supercharger is a turbocharger driven by an exhaust emission from the above-described engine. In the vehicle provided with the above-described turbocharger operable to place the above-described engine in a supercharging state, the operating response of the above-described engine is considerably delayed upon switching from the above-described second operating state to the above-described first operating state. However, the present invention makes it possible to effectively improve the response of the vehicle to an operation by the vehicle operator to accelerate the vehicle.

In one preferred form of the invention, the above-described automatic transmission is shifted to select the above-described second speed ratio value and then shifted to select the above-described first speed ratio value, if said engine will be placed in said first operating state if the above-described automatic transmission is shifted to select the above-described first speed ratio value while the rate of increase of the operation amount of the above-described accelerator pedal is equal to or higher than a predetermined threshold value in the above-described second operating state of the above-described engine.

In another preferred form of the invention, the above-described speed ratio selection control is implemented such that a shifting action of the above-described automatic transmission which is performed to select the above-described first speed ratio value when the rate of increase of the operation amount of the above-described accelerator pedal is relatively small is a shift-down action of the automatic transmission, while a shifting action of the above-described automatic transmission to select the above-described first speed ratio value after selection of the above-described second speed ratio value is a shift-up action of the automatic transmission.

Namely, the above-described speed ratio selection control is implemented to shift down the above-described automatic transmission to select the above-described first speed ratio value, when the rate of increase of the operation amount of the above-described accelerator pedal is relatively small, and to shift down the above-described automatic transmission to select the above-described second speed ratio value and then shift up the automatic transmission to select the above-described first speed ratio value, when the rate of increase of the operation amount of the above-described accelerator pedal is relatively high.

MODE FOR CARRYING OUT THE INVENTION

An embodiment of this invention will be described in detail by reference to the drawings.

Embodiment

Figure 1:
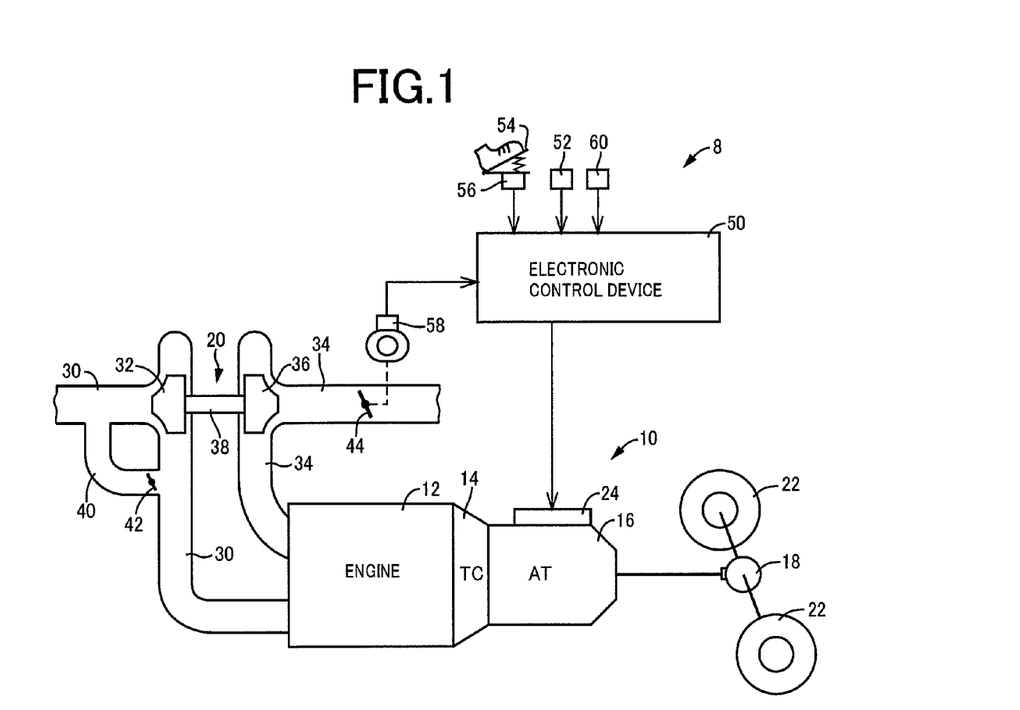
FIG. 1 is a schematic view showing an arrangement of a vehicle to which the present invention is applicable.

FIG. 1 is the schematic view showing an arrangement of a vehicle 8 to which the present invention is applicable. As shown in FIG. 1, the vehicle 8 is of an FR (front-engine rear-drive) type. The vehicle 8 is provided with a vehicular drive system 10, an electronic control device 50 for controlling the vehicular drive system 10, and drive wheels 22. The vehicular drive system 10 is provided with: an engine 12 which is a commonly known gasoline or diesel engine for automobiles; a torque converter 14 configured to transmit a drive force through a working fluid; an automatic transmission 16; a differential gear device (final speed reducing device) 18 configured to absorb a speed difference between the left and right drive wheels 22; and a supercharger 20. In the vehicle 8, a drive force of the engine 12 is transmitted from its crankshaft, namely, from the engine output shaft to the pair of drive wheels 22 through the torque converter 14, automatic transmission 16, differential gear device 18 and a pair of axles.

The automatic transmission 16 constitutes a portion of a power transmitting path between the engine 12 and the drive wheels 22, and is configured to transmit the drive force of the engine 12 to the drive wheels 22. The automatic transmission 16 is a step-variable transmission having a plurality of predetermined speed positions (gear positions) one of which is selectively established, and is provided with a plurality of planetary gear sets, and a plurality of clutches and brakes, that is, a plurality of hydraulically operated frictional coupling devices, to perform shifting actions. The frictional coupling devices are operated with a hydraulic pressure received from a hydraulic control unit 24. Although the number of the speed positions of the automatic transmission 16 is not particularly limited, the automatic transmission 16 in the present embodiment has six forward drive speed positions. A speed ratio γat of the automatic transmission 16 is determined by its input speed and the output speed, that is, γat=the input speed of the automatic transmission 16/the output speed of the automatic transmission 16. Accordingly, the speed ratio γat increases as the automatic transmission 16 is shifted from a relatively high-speed position to a relatively low-speed position.

Like a known automatic shifting control, an automatic shifting control of the automatic transmission 16 is implemented on the basis of a running condition of the vehicle represented by a running speed V of the vehicle and an operation angle or amount Acc of an accelerator pedal 54, and according to predetermined shifting lines, in other words, a shifting map formulated to determine the speed position to which the automatic transmission 16 should be shifted. An example of a generally well known shifting map is indicated in block FG08 of FIG. 5. The electronic control device 50 is basically configured to determine the speed position to which the automatic transmission 16 should be shifted, on the basis of the vehicle running condition (running speed V and accelerator pedal operation amount Acc), and according to the predetermined shifting map, and to shift the automatic transmission 16 to the thus determined speed position. The shifting map includes shift-up lines for shifting up the automatic transmission 16, and shift-down lines for shifting down the automatic transmission 16. In the block FG08 of FIG. 5, the shift-up lines except for the shift-up line for a shift-up action from the fifth speed position to the sixth speed position are not shown, for easier understanding of the shifting map. The shifting map is formulated to shift the automatic transmission 16 to one of the speed positions in which the engine fuel economy is highest at a given value of the engine output (unit: kW, for example). As described below, the shifting actions of the automatic transmission 16 may be temporarily controlled without following the shifting map. In this respect, it is noted that the degree of deterioration of the engine fuel economy increases with an increase of a difference of the speed ratio γat of the presently established speed of the automatic transmission 16 from the speed ratio γat of the speed position which should be established according to the shifting map.

The supercharger 20 is disposed in an intake system of the engine 12, and is a known turbocharger which is driven by an exhaust emission from the engine 12 to raise the pressure of the intake air introduced in the engine 12. Described more specifically referring to FIG. 1, the supercharger 20 is provided with: an exhaust turbine wheel 32 which is disposed within an exhaust pipe 30 of the engine and which is rotated by the exhaust emission from the engine 12; an intake compressor wheel 36 which is disposed in an intake pipe 34 of the engine 12 and which is rotated by the exhaust turbine wheel 32 to compress the intake air of the engine 12; and a rotary shaft 38 connecting the exhaust turbine wheel 32 and the intake compressor wheel 36 to each other.

There are provided: an exhaust bypass passage 40 connected in parallel to an exhaust passage of the exhaust pipe 30 in which the exhaust turbine wheel 32 is disposed; and a waste gate valve 42 which selectively opens and closes the exhaust bypass passage 40. When the waste gate valve 42 is placed in a closed state, the exhaust emission from the engine 12 is drawn toward the exhaust turbine wheel 32, so that the engine 12 is placed in a first operating state, that is, a supercharging state in which the supercharger 20 is operated. When the waste gate valve 42 is placed in an open state, on the other hand, the exhaust emission from the engine 12 is exhausted through the exhaust bypass passage 40, without the exhaust emission reaching the exhaust turbine wheel 32, so that the engine 12 is placed in a second operating state, that is, a natural aspiration state (which may be called an "NA state") in which the operation of the supercharger 20 is restricted as compared with that in the above-indicated supercharging state. Thus, the operating state of the engine 12 is switched depending upon the open or closed state of the waste gate valve 42. In this respect, the waste gate valve 42 is considered to function as an engine operation switching device configured to switch the engine 12 between the above-indicated supercharging state and the above-indicated NA state. The electronic control device 50 controls an electrically operated actuator of the waste gate valve 42, to selectively open and close the waste gate valve 42.

Figure 2:
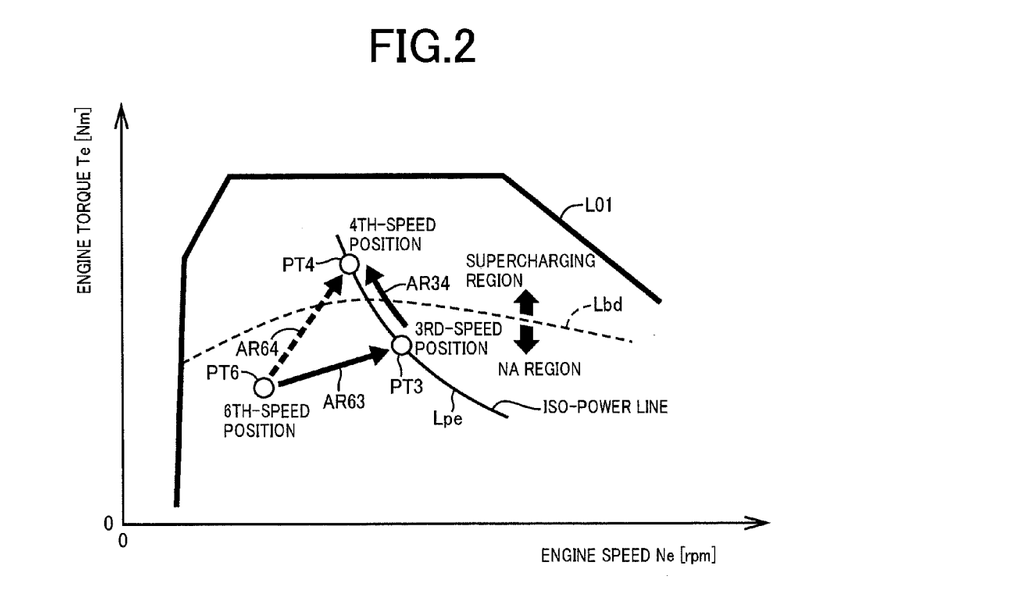
FIG. 2 is a view showing an engine operation map used on the vehicle of FIG. 1, which indicates an operating state of an engine in a two-dimensional coordinate system in which an operating speed and a torque of the engine are taken along respective two axes.

FIG. 2 is the view showing an engine operation map which indicates the operating state of the engine 12 in a two-dimensional coordinate system in which an engine speed Ne and an engine torque Te are taken along respective two axes. In FIG. 2, a solid line L01 represents a relationship between the engine speed Ne and the engine torque Te when an opening angle θth of an electronic throttle valve 44 (hereinafter referred to as a "throttle opening angle θth") disposed within the intake pipe 34 of the engine 12 is 100%, that is, when the electronic throttle valve 44 is placed in a fully open state. The engine operation map is obtained by experimentation and stored in the electronic control device 50, and is divided into a supercharging region, that is, a first operating region in which the engine 12 is placed in the above-indicated supercharging state, and a natural aspiration region (NA region), that is, a second operating region in which the engine 12 is placed in the above-indicated natural aspiration state, as shown in FIG. 2. Described more specifically, the engine operation map consists of the supercharging region located on a high engine torque side of a broken boundary line Lbd, and the NA region located on a low engine torque side of the boundary. When an operating point of the engine 12 (hereinafter referred to as an "engine operating point") represented by the engine speed Ne and the engine torque Te has moved from the NA region into the supercharging region across the broken boundary line Lbd, for example, the waste gate valve 42 is switched from the open state to the closed state, namely, the operating state of the engine 12 is switched from the NA state to the supercharging state. When the engine operating point has moved from the supercharging region into the NA region across the broken boundary line Lbd, on the other hand, the waste gate valve 42 is switched from the closed state to the open state, namely, the operating state of the engine 12 is switched from the supercharging state to the NA state.

Referring back to FIG. 1, the electronic control device 50 functions as a control device for controlling the vehicular drive system 10, and is configured to implement a drive control of the engine 12, and a shifting control of the automatic transmission 16, for instance. The electronic control device 50 includes a so-called microcomputer. The electronic control device 50 is configured to receive various input signals generated from various sensors provided on the vehicle 8. For example, the electronic control device 50 receives: an output signal of a vehicle speed sensor 52 indicative of the vehicle running speed V; an output signal of an accelerator pedal operation amount sensor 56 indicative of the operation amount Acc of the accelerator pedal which corresponds to a degree of acceleration of the vehicle required by the vehicle operator; an output signal of a throttle opening angle sensor 58 indicative of the throttle opening angle θth; and an output signal of an engine speed sensor 60 indicative of the engine speed Ne.

The electronic control device 50 is further configured to generate various output signals to be applied to various devices provided on the vehicle 8. For example, the electronic control device 50 implements a throttle control to control an electrically operated actuator for regulating the throttle opening angle θth according to the accelerator pedal operation amount Acc, such that the throttle opening angle θth increases with an increase of the accelerator pedal operation amount Acc.

Figure 3:
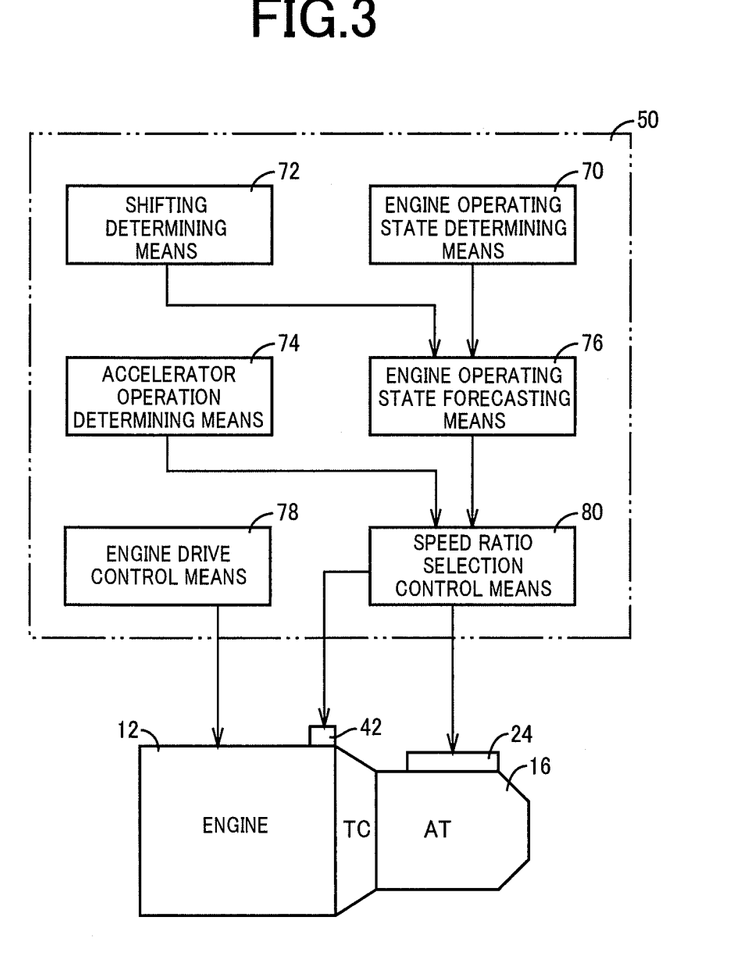
FIG. 3 is a functional block diagram for explaining major control functions of an electronic control device shown in FIG. 1.

FIG. 3 is the functional block diagram for explaining major control functions of the electronic control device 50. As shown in FIG. 3, the electronic control device 50 includes an engine operating state determining portion in the form of engine operating state determining means 70, a shifting determining portion in the form of shifting determining means 72, an accelerator operation determining portion in the form of accelerator operation determining means 74, an engine operating state forecasting portion in the form of engine operating state forecasting means 76, an engine drive control portion in the form of engine drive control means 78, and a speed ratio selection control portion in the form of speed ratio selection control means 80.

The engine operating state determining means 70 is configured to determine whether the engine 12 is presently placed in the NA state (second operating state) or not, namely, whether the engine 12 is operating in the NA state or not. For instance, this determination is made depending upon whether the waste gate valve 42 is placed in the open state or closed state.

The shifting determining means 72 is configured to obtain the vehicle running speed V and the accelerator pedal operation amount Acc, from time to time, and determine whether the automatic transmission 16 should be shifted or not, on the basis of the vehicle conditions representing the detected vehicle running speed V and accelerator pedal operation amount Acc, and according to the above-described shifting map. When the point indicative of the vehicle running state has moved across a shift-up line (indicated in block FG08 of FIG. 5) in the shifting map, in the direction of decrease of the accelerator pedal operation amount Acc or in the direction of increase of the vehicle running speed V, for example, the shifting determining means 72 determines that a shift-up action of the automatic transmission 16 which corresponds to that shift-up line should take place. When the point indicative of the vehicle running state has moved across a shift-down line in the shifting map in the direction of increase of the accelerator pedal operation amount Acc or in the direction of decrease of the vehicle running speed V, the shifting determining means 72 determines that a shift-down action of the automatic transmission 16 which corresponds to that shift-down line should take place.

The accelerator operation determining means 74 is configured to obtain the accelerator pedal operation amount Acc from time to time, and calculate an amount of increase of the accelerator pedal operation amount Acc per unit time, that is, a increase rate SPacc of the accelerator pedal operation amount Acc. When the shifting determining means 72 has determined that the above-indicated shift-down action should take place, as a result of an increase of the accelerator pedal operation amount Acc, the accelerator operation determining means 74 determines whether this increase has been caused by a quick operation of the accelerator pedal 54, or a slow operation of the accelerator pedal 54. For instance, the accelerator operation determining means 74 determines that the quick operation of the accelerator pedal 54 has been performed, if the increase rate SPacc of the accelerator pedal operation amount Acc is equal to or higher than a predetermined threshold value SP1acc, and determines that the slow operation of the accelerator pedal 54 has been performed, if the increase rate SPacc of the accelerator pedal operation amount Acc is lower than the threshold value SP1acc. This threshold value SP1acc is obtained by experimentation such that the accelerator operation determining means 74 determines that the quick operation of the accelerator pedal 54 has been performed, if the increase rate SPacc of the accelerator pedal operation amount Acc is high enough for the vehicle operator to recognize a delayed operating response of the engine 12 upon its switching from the NA state to the supercharging state.

The engine operating state forecasting means 76 is configured to obtain the engine operating point after completion of a shift-down action of the automatic transmission 16 which is assumed to take place according to the determination of this shift-down action by the shifting determining means 72, that is, according to the shifting map, when the engine operating state determining means 70 obtains an affirmative determination that the engine 12 is placed in the NA state and the shifting determining means 72 determines downshifting of the automatic transmission 16. For instance, the engine operating state forecasting means 76 calculates a target drive force FTcr, that is, a target value of the drive force of the vehicle 8, on the basis of the accelerator pedal operation amount Acc and the vehicle running speed V, and according to a predetermined relationship. After calculation of the target drive force FTcr, the engine operating state forecasting means 76 calculates a target engine torque Tet, that is, a target value of the engine torque Te, on the basis of the calculated target drive force FTcr and by taking account of the speed ratio γ1at (hereinafter referred to as a "first speed ratio value γ1at") of the automatic transmission 16 after its shifting action according to the shifting map. Further, the engine operating state forecasting means 76 calculates a target engine speed Net, that is, a target value of the engine speed Ne, on the basis of the vehicle running speed V and by taking account of the above-indicated first speed ratio value γ1at. The engine operating state forecasting means 76 obtains the engine operating point represented by the thus calculated target engine speed Net and target engine torque Tet, as the engine operating point (hereinafter referred to as an "assumed post-shifting engine operating point") after completion of the shift-down action of the automatic transmission 16 which is assumed to take place according to the shifting map.

After the engine operating state forecasting means 76 has obtained the above-indicated assumed post-shifting engine operating point, the engine operating state forecasting means 76 determines whether the obtained assumed post-shifting engine operating point lies in the above-indicated supercharging region or the above-indicated NA region in the engine operation map indicated in FIG. 2. If the assumed post-shifting engine operating point lies in the supercharging region, the engine operating state forecasting means 76 determines that the engine 12 will be placed in the supercharging state, as a result of the shifting action of the automatic transmission 16 according to the shifting map, to the speed position having the above-indicated first speed ratio value γ1at, which is a speed ratio γat after shifting.

The engine drive control means 78 is configured to obtain the engine speed Ne, accelerator pedal operation amount Acc and vehicle running speed V, from time to time, and calculate the target drive force FTcr on the basis of the accelerator pedal operation amount Acc and the vehicle running speed V and according to the predetermined relationship, like the engine operating state forecasting means 76. After calculation of the target drive force FTcr, the engine drive control means 78 calculates the target engine torque Tet on the basis of the target drive force FTcr and by taking account of the present speed ratio γat of the automatic transmission 16. For instance, the engine drive control means 78 calculates the target engine torque Tet such that the calculated target engine torque Tet is proportional to a value (=FTcr/γat) which is equal to the target drive force FTcr divided by the speed ratio γat. The engine drive control means 78 regulates the throttle opening angle θth from time to time, while taking account of the engine speed Ne, such that the engine torque Te coincides with the target value Tet. For example, the engine drive control means 78 estimates the engine torque Te from time to time, according to a predetermined relationship among the engine torque Te, engine speed Ne and throttle opening angle θth, which relationship is obtained by experimentation.

The speed ratio selection control means 80 is configured to implement a speed ratio selection control to change the method of selecting the speed position, namely, the speed ratio γat of the automatic transmission 16, according to the increase rate SPacc of the accelerator pedal operation amount Acc, when the engine 12 will be placed in the supercharging state as a result of the shifting action of the automatic transmission 16 according to the shifting map to select the first speed ratio value γ1at while the engine 12 is placed in the NA state. That is, the speed ratio selection control means 80 implements the speed ratio selection control when the engine operating state forecasting means 76 has determined that the engine 12 will be placed in the supercharging state as a result of the shifting action of the automatic transmission 16 to select the above-indicated first speed ratio value γ1at.

Described more specifically, the speed ratio selection control is implemented by the speed ratio selection control means 80, so as to shift the automatic transmission 16 to select the first speed ratio value γ1at, namely, to shift the automatic transmission 16 according to the shifting map, when the increase rate SPacc of the accelerator pedal operation amount Acc is relatively low. When the increase rate SPacc of the accelerator pedal operation amount Acc is relatively high, on the other hand, the speed ratio selection control means 80 does not shift the automatic transmission 16 according to the shifting map, but shifts the automatic transmission 16 to the speed position having a second speed ratio value γ2at at which the engine 12 is kept in the above-indicated NA state and which is higher than the first speed ratio value γ1at. Then, the speed ratio selection control means 80 shifts the automatic transmission 16 from the speed position having the second speed ratio value γ2at to the speed position having the first speed ratio value γ1at. That is, the speed ratio selection control means 80 temporarily places the automatic transmission 16 in a comparatively low-gear or second shift position SH02 having the second speed ratio value Vat rather than a comparatively high-gear or first shift position SH01 having the first speed ratio value γ1at, and then shifts the automatic transmission 16 to the first shift position SH01 according to the shifting map. Described in more detail, the speed ratio selection control is implemented by the speed ratio selection control means 80 such that the automatic transmission 16 is shifted to select the first speed ratio value γ1at (to the first shift position SH01) according to the shifting map when the accelerator operation determining means 74 has determined that the slow operation of the accelerator pedal 54 has been performed, and such that the automatic transmission 16 is initially shifted to select the second speed ratio value γ2at (to the second shift position SH02) and then shifted to select the first speed ratio value γ1at when the accelerator operation determining means 74 has determined that the quick operation of the accelerator pedal 54 has been performed. In the example of FIG. 2, the automatic transmission 16 is presently placed in the sixth speed position, and the vehicle running state is represented by a point PT6 lying in the NA region. Further, the first shift position SH01 is the fourth speed position, and the vehicle running state corresponding to the fourth speed position is represented by a point PT4 lying in the supercharging region, while the second shift position SH02 is the third speed position, and the vehicle running state corresponding to the third speed position is represented by a point PT3 lying in the NA region. In this example, the speed ratio selection control is implemented by the speed ratio selection control means 80 such that when the accelerator pedal 54 is operated slowly, the automatic transmission 16 is shifted down from the sixth speed position to the fourth speed position so that the vehicle running state changes as indicated by an arrow AR64, and such that when the accelerator pedal 54 is operated quickly, the automatic transmission 16 is initially shifted down from the sixth speed position to the third speed position so that the vehicle running state changes as indicated by an arrow AR63, and is then shifted up from the third speed position to the fourth speed position so that the vehicle running state changes as indicated by an arrow AR34.

The second shift position SH02 may be any one of the speed positions of the automatic transmission 16 which is a lower-gear position than the first shift position SH01 and in which the engine 12 is kept in the NA state. In the above-described example, the second shift position SH02 is the highest-gear position of the speed positions in which the engine 12 is kept in the NA state.

In the above-described speed ratio selection control, the waste gate valve 42 may be opened and closed according to the engine operation map (indicated in FIG. 2) irrespective of the increase rate SPacc of the accelerator pedal operation amount Acc. In the present embodiment, however, the speed ratio selection control is implemented by the speed ratio selection control means 80 such that the waste gate valve 42 is switched from the open state to the closed state to switch the engine 12 from the NA state to the supercharging state, before the engine operating point in the engine operation map has been moved from the NA region into the supercharging region as a result of the shift-up action of the automatic transmission 16 from the second shift position SH02 to the first shift position SH01 according to the speed ratio selection control. For example, the speed ratio selection control means 80 commands the waste gate valve 42 to be switched from the open state to the closed state to switch the engine 12 from the NA state to the supercharging state, after the shifting action to the second shift position SH02 and before the shifting action from the second shift position SH02 to the first shift position SH01. It is noted that the switching of the engine 12 from the NA state to the supercharging state before the movement of the engine operating point from the NA region into the supercharging region causes the engine torque Te to be increased as compared with that where the engine 12 is operated according to the engine operation map. In the present embodiment, however, the throttle opening angle θth is regulated so as to prevent this temporary increase of the engine torque Te.

The speed ratio selection control means 80 may implement the speed ratio selection control such that the automatic transmission 16 which has been initially shifted to the second shift position SH02 is shifted to the first shift position SH01 immediately after the shifting action to the second shift position. In the present embodiment, however, the speed ratio selection control means 80 is configured to shift the automatic transmission 16 from the second shift position SH02 to the first shift position SH01 when a predetermined waiting time TIMEs has expired after the moment of completion of the shifting action to the second shift position SH02. For instance, this waiting time TIMEs is determined by experimentation such that the waiting time TIMEs is the shortest to the extent that allows a rise of the supercharging pressure of the supercharger 20 prior to the moment of completion of the shifting action of the automatic transmission 16 from the second shift position SH02 to the first shift position SH01.

Figure 4:
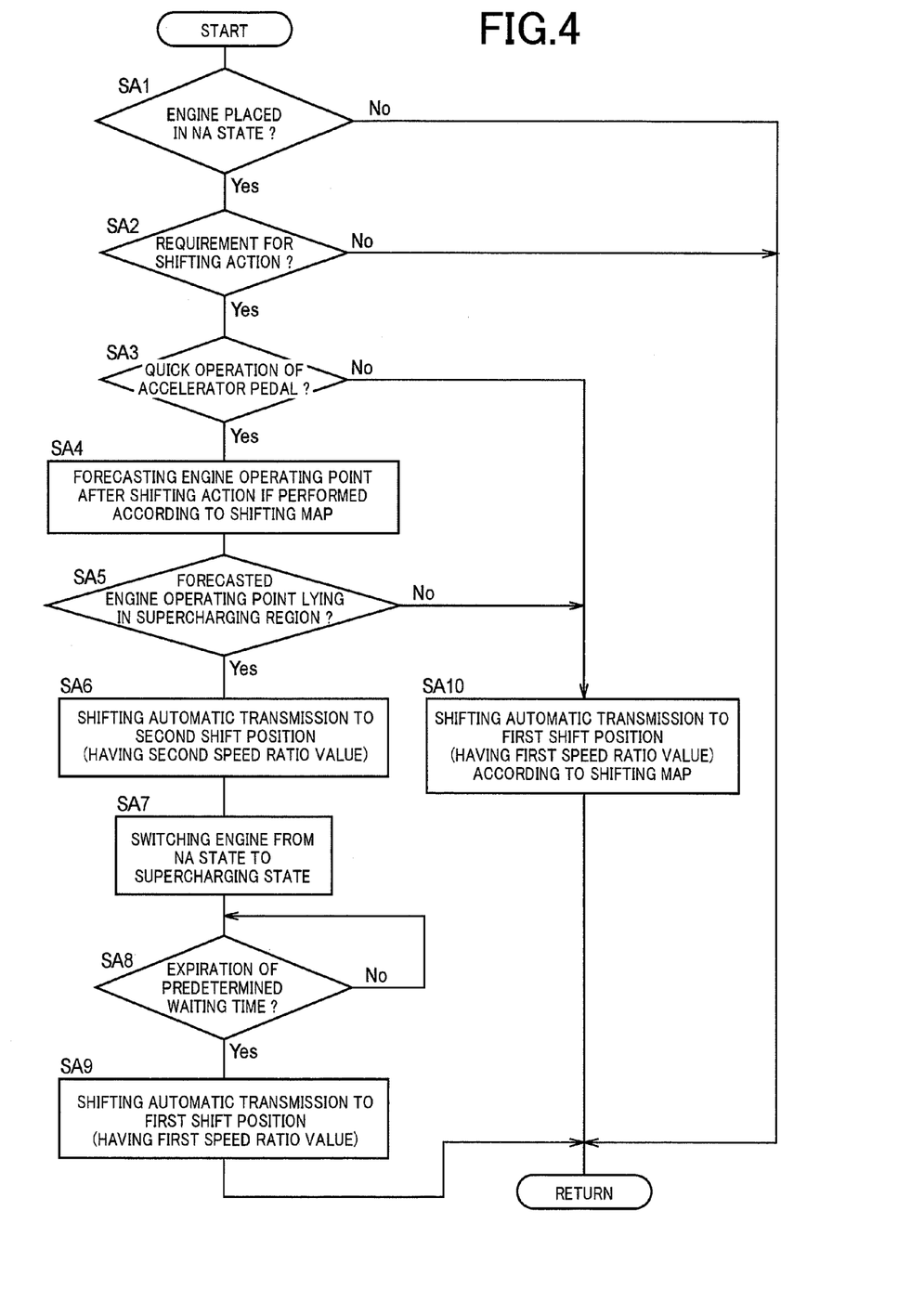
FIG. 4 is a flow chart for explaining a major control operation of the electronic control device of FIG. 1, namely, a control operation to implement a speed ratio selection control.

FIG. 4 is the flow chart for explaining a major control operation of the electronic control device 50, namely, a control operation to implement the speed ratio selection control. This control operation is repeatedly performed with an extremely short cycle time of several milliseconds to several tens of milliseconds. The control operation of FIG. 4 may be performed alone, or concurrently with any other control operation.

The control operation of FIG. 4 is initiated with step SA1 ("step" being hereinafter omitted), to determine whether the engine 12 is placed in the NA state. If an affirmative determination is obtained in SA1, that is, if the engine 12 is placed in the NA state, the control flow goes to SA2. If a negative determination is obtained in SA1, on the other hand, the present control routine is terminated. It is noted that SA1 corresponds to the engine operating state determining means 70.

SA2 corresponding to the shifting determining means 72 is implemented to make a determination of a requirement for a shifting action of the automatic transmission 16, more specifically, to determine whether a shift-down action of the automatic transmission 16 is required. This determination is made on the basis of the vehicle conditions representing the vehicle running speed V and the accelerator pedal operation amount Acc, and according to the above-described shifting map. If an affirmative determination is obtained in SA2, that is, if it is determined that the shift-down action is required, the control flow goes to SA3. If a negative determination is obtained in SA2, on the other hand, the present control routine is terminated.

SA3 corresponding to the accelerator operation determining means 74 is implemented to determine whether the operation of the accelerator pedal 54 which has caused the requirement for the shifting action in SA2 is the quick operation defined as described above. If an affirmative determination is obtained in SA3, that is, if the quick operation of the accelerator pedal 54 has been performed, the control flow goes to SA4. If a negative determination is obtained in SA3 with the slow operation of the accelerator pedal 54, on the other hand, the control flow goes to SA10.

SA4 is implemented to forecast the engine operating point after a shift-down action of the automatic transmission 16 if performed according to the shifting map, namely, to obtain the assumed post-shifting engine operating point described above. SA4 is followed by SA5.

SA5 is implemented to determine whether the engine operating point forecasted in SA4, that is, the above-indicated assumed post-shifting engine operating point lies in the above-indicated supercharging region in the engine operation map (indicated in FIG. 2). If an affirmative determination is obtained in SA5, that is, if the assumed post-shifting engine operating point lies in the supercharging region, the control flow goes to SA6. If a negative determination is obtained in SA5, that is, if the assumed post-shifting engine operating point lies in the NA region, on the other hand, the control flow goes to SA10. It is noted that SA4 and SA5 correspond to the engine operating state forecasting means 76.

SA6 is implemented to shift the automatic transmission 16 to select the second speed ratio value γ2at, that is, to shift the automatic transmission 16 to the second shift position SH02 having the second speed ratio value γ2at, rather than to shift the automatic transmission 16 according to the shifting map. At this time, the engine output after the shift-down action is controlled to the same value as in the case where the automatic transmission 16 is shifted to the first shift position SH01 according to the shifting map. SA6 is followed by SA7.

SA7 is implemented to switch the waste gate valve 42 from the open state to the closed state immediately after the moment of completion of the shift-down action to the second shift position SH02 in SA6, so that the engine 12 is switched from the NA state to the supercharging state. SA7 is followed by SA8.

SA8 is implemented to determine whether the predetermined waiting time TIMEs has expired after the moment of completion of the shift-down action to the second shift position SH02 in SA6. If an affirmative determination is obtained in SA8, the control flow goes to SA9. If a negative determination is obtained in SA8, on the other hand, this step SA8 is repeated. Namely, the control flow goes to SA9 when the predetermined waiting time TIMEs has expired after the moment of completion of the shift-down action to the second shift position SH02.

SA9 is implemented to shift the automatic transmission 16 to change the speed ratio from the second speed ratio value γ2at to the first speed ratio value γ1at, that is, to shift up the automatic transmission 16 from the second shift position SH02 to the first shift position SH01. At this time, the shift-up action from the second shift position SH02 to the first shift position SH01 is an iso-power shifting action i.e., the engine output is held constant, if the accelerator pedal operation amount Acc and the vehicle running speed V are held constant before, during and after the shifting action.

SA10 is implemented to shift the automatic transmission 16 to the first shift position SH01 according to the shifting map, that is, to shift down the automatic transmission 16 to the first shift position SH01 having the first speed ratio value γ1at. It is noted that SA6-SA10 correspond to the speed ratio selection control means 80.

Figure 5:
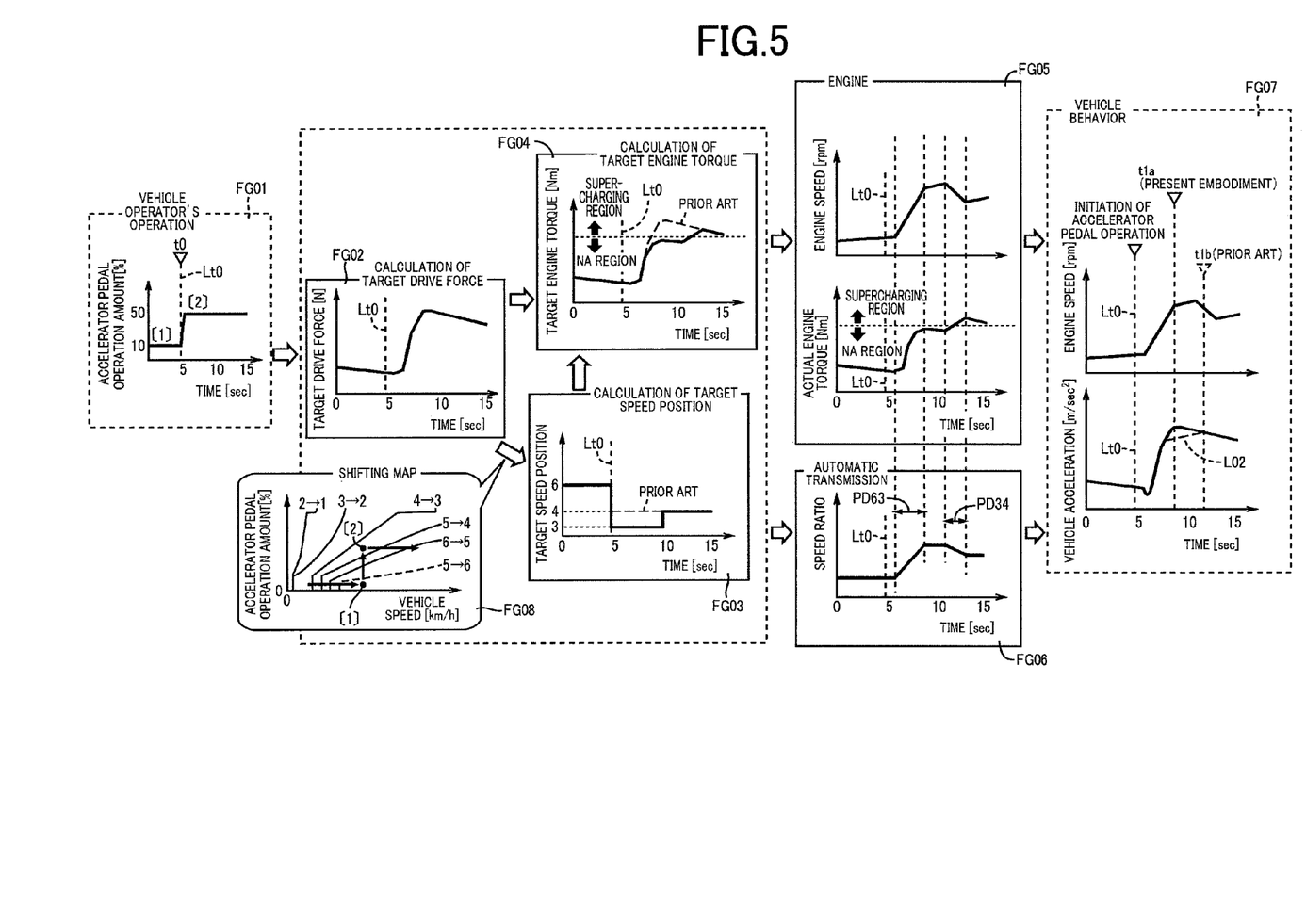
FIG. 5 is a time chart for explaining the above-indicated speed ratio selection control, in the case of a quick operation of an accelerator pedal during running of the vehicle described in FIG. 1 with its automatic transmission being placed in a sixth speed position and with the engine being placed in an NA state.

FIG. 5 is the time chart for explaining the above-indicated speed ratio selection control, in the case of the quick operation of the accelerator pedal 54 during running of the vehicle with the automatic transmission 16 being placed in the sixth speed position and with the engine 12 being placed in the NA state. In FIG. 5, a block FG01 is a time chart indicating a change of the operation amount Acc of the accelerator pedal operated by the vehicle operator, and a block FG02 is a time chart indicating a change of a target drive force FTcr, while a block FG03 is a time chart indicating a change of a target speed position of the automatic transmission 16. Further, a block FG04 is a time chart indicating a change of the target engine torque Tet, and a block FG05 is a time chart indicating changes of the engine speed Ne and engine torque Te, while a block FG06 is a time chart indicating a change of the speed ratio γat of the automatic transmission 16. Further, a block FG07 is a time chart indicating changes of the engine speed Ne and the vehicle acceleration value which represent the behavior of the vehicle, and a block FG08 indicates the above-described predetermined shifting map. In all of the time charts FG01-FG07, a broken line Lt0 indicates a point of time t0 (indicated in the time chart FG01) at which the operation of the accelerator pedal 54 is initiated. The engine speed Ne in the time chart FG05 is the same as the engine speed Ne in the time chart FG07. The engine torque Te in the time chart FG05 is the actual engine torque Te which is distinguished from the target engine torque Tet.

The time chart FG01 in FIG. 5 indicates that the quick operation of the accelerator pedal 54 is initiated at the point of time t0. As indicated in the time chart FG02 in FIG. 5, the target drive force FTcr is calculated from time to time on the basis of the accelerator pedal operation amount Acc and the vehicle running speed V. As a result of the operation of the accelerator pedal 54 initiated at the point of time t0, the target drive force FTcr is abruptly increased, as indicated in the time chart FG02. In the example of FIG. 5, the vehicle 8 is in an accelerating state, as is apparent from a change of the vehicle state represented by the running speed V and the accelerator pedal operation amount Acc, from a point [1] to a point [2], as indicated by an arrow in the shifting map FG08, as a result of the operation of the accelerator pedal 54 initiated at the point of time t0. Namely, the point indicative of the vehicle state moves across the shift-down line for the shift-down action from the sixth speed position to the fifth speed position, and the shift-down line for the shift-down action from the fifth speed position to the fourth speed position, at substantially the same point of time, in the direction of increase of the accelerator pedal operation amount Acc. Accordingly, the shifting determining means 72 determines that the shift-down action from the sixth speed position to the fourth speed position should take place. As a result, the affirmative determination is obtained in SA2 in FIG. 4. Since the operation of the accelerator pedal 54 initiated at the point of time t0 is the quick operation, the affirmative determination is obtained in SA3 in FIG. 4. It will be understood from the above-described determination of the shift-down action that the first shift position SH01 is the fourth speed position in the present example.

In the example of FIG. 5, the engine operating point is the point PT6 indicated in FIG. 2, before the shifting action of the automatic transmission 16, that is, while the automatic transmission 16 is placed in the sixth speed position. Since the automatic transmission 16 is shifted from the sixth speed position to the fourth speed position according to the shifting map (as indicated by the arrow AR64), the above-indicated assumed post-shifting engine operating point which is the engine operating point after completion of the shifting action to the fourth speed position is the point PT4 indicated in FIG. 2. In the case of the shifting action of the automatic transmission 16 from the sixth speed position to the third speed position (as indicated by the arrow AR63), the engine operating point after this shifting action to the third speed position is the point PT3 indicated in FIG. 2. A solid line Lpe in FIG. 2 is an iso-power line of the engine 12 which is defined by a series of points of the engine output increased as a result of the operation of the accelerator pedal 54 initiated at the point of time t0. Since the point PT4 lies in the above-indicated supercharging region, as indicated in FIG. 2, the affirmative determination is obtained in SA5 in FIG. 4. Further, since the point PT3 lies in the above-indicated NA region, and since the third speed position of the automatic transmission 16 is the highest-gear position of the speed positions (first through third speed positions) in which the engine 12 is kept in the NA state, the second shift position SH02 is the third speed position.

Since the affirmative determination is obtained in SA5 in FIG. 4, the target speed position (target gear position) of the automatic transmission 16 is temporarily changed from the sixth speed position to the third speed position (second shift position SH02), and is then changed to the fourth speed position (first shift position SH01), as indicated in the time chart FG03 of FIG. 5. Further, the target engine torque Te determined on the basis of the target drive force FTcr indicated in the time chart FG02 and the target speed position indicated in the time chart FG03 changes as indicated in the time chart FG03. In the case where the target speed position after completion of shifting from the sixth speed position is the third speed position as indicated in the time chart FG04, the engine speed Ne is higher than where the target speed position is the fourth speed position, so that the target engine torque Tet corresponding to the target third speed position is accordingly lowered as shown in the time chart FG04, whereby the engine operating point corresponding to this target engine torque Tet lies in the NA region. In this respect, it is noted that broken lines labeled "prior art" in the time charts FG03 and FG04 represent the prior art in which the automatic transmission 16 is always shifted according to the shifting map, without implementation of the speed ratio selection control described above.

The speed ratio γat of the automatic transmission 16 changes as indicated in the time chart FG06 while the engine speed Ne and engine torque Te change as indicated in the time chart FG05, as the target speed position of the automatic transmission 16 changes as indicated in the time chart FG03 while the target engine torque Tet changes as indicated in the time chart FG04. Described more specifically, the speed ratio γat of the automatic transmission 16 increases in the process of the shift-down action of the automatic transmission 16 from the sixth speed position to the third speed position, and decreases in the process of the shift-up action from the third speed position to the fourth speed position, as indicated in the time chart FG06. In the time chart FG06, a period of time PD63 is a period of the shift-down action from the sixth speed position to the third speed position, while a period of time PD34 is a period of the shift-up action from the third speed position to the fourth speed position. Further, as indicated in the time chart FG05, the engine torque Te changes so as to coincide with the target engine torque Tet, and the engine speed Ne rises as a result of the shift-down action of the automatic transmission 16 from the sixth speed position to the third speed position and drops as a result of the shift-up action from the third speed position to the fourth speed position. The changes of the engine speed Ne and engine torque Te indicated in the time chart FG05 are represented by a movement of the engine operating point from the point PT6 to the point PT3 within the NA region as indicated in FIG. 2, as a result of the shift-down action from the sixth speed position to the third speed position (indicated by the arrow AR63), and by a movement of the engine operating point from the point PT3 to the point PT4 along the iso-power line (represented by the solid line Lpe) as indicated in FIG. 2, as a result of the shift-up action from the third speed position to the fourth speed position (indicated by the arrow AR34).

As described above, the shift-down action from the sixth speed position to the third speed position takes place while the engine 12 is kept in the NA state, and a delay of the operating response of the engine 12 upon switching from the NA state to the supercharging state is prevented, so that the vehicle acceleration value indicated in the time chart FG07 changes in a pattern close to the pattern of change of the target drive force FTcr indicated in the time chart FG02. A broken line L02 in the time chart FG07 represents the vehicle acceleration value which changes with a change of the target speed position along a broken line labeled "prior art" in the time chart FG03. The vehicle acceleration value changes as indicated by the broken line L02 due to the above-indicated delay of the operating response upon switching of the engine 12 from the NA state to the supercharging state during the shifting action of the automatic transmission 16 from the sixth speed to the fourth speed. As is apparent from the solid line and broken line L02 in the time chart FG07, the vehicle acceleration value reaches the highest point, that is, the vehicle operator recognizes the moment of completion of the response of the vehicle 8 to the operation of the accelerator pedal 54, at a point of time t1b in the prior art, and at a point of time t1a in the present embodiment, which is earlier than the above-indicated point of time t1b in the prior art. Namely, in the example of FIG. 5 in which the automatic transmission 16 is once shifted from the sixth speed position to the third speed position and is then shifted from the third speed position to the fourth speed position, the response of the vehicle 8 to the required vehicle acceleration is improved in the present embodiment as compared with that in the prior art in which the automatic transmission 16 is shifted from the sixth speed position directly to the fourth speed position according to the shifting map.

In the present embodiment, the speed ratio selection control means 80 implements the speed ratio selection control to change the method of selecting the speed position, that is, the speed ratio γat of the automatic transmission 16, depending upon the increase rate SPacc of the accelerator pedal operation amount Acc, where the engine 12 will be placed in the above-indicated supercharging state (first operating state) if the automatic transmission 16 is shifted to select the first speed ratio value γ1at according to the above-described shifting map while the engine 12 is placed in the above-indicated NA state (second operating state). Described more specifically, the speed ratio selection control means 80 is configured to implement the speed ratio selection control so as to shift the automatic transmission 16 to select the first speed ratio value γ1at according to the above-indicated shifting map when the increase rate SPacc of the accelerator pedal operation amount Acc is relatively low, and so as to shift the automatic transmission 16 to select the second speed ratio value γ2at at which the engine 12 is kept in the above-indicated NA state and which is higher than the first speed ratio value γ1at, when the increase rate SPacc of the accelerator pedal operation amount Acc is relatively high. In this respect, it is noted that the degree of delay of the operating response of the engine 12 as recognized by the vehicle operator upon switching of the engine 12 from the above-indicated NA state to the above-indicated supercharging state increases with an increase of the speed of operation of the accelerator pedal 54 by the vehicle operator. Accordingly, when the increase rate SPacc of the accelerator pedal operation amount Acc is relatively high while the engine 12 is placed in the above-indicated NA state, the drive force to drive the vehicle 8 is obtained according to the accelerator pedal operation amount Acc, owing to the shifting action of the automatic transmission 16 to select the second speed ratio value γ2at with the engine 12 being kept in the NA state, and owing to a rise of the engine speed Ne. Accordingly, the response of the vehicle 8 to an operation by the vehicle operator to accelerate the vehicle 8 can be improved as compared in the case where the automatic transmission 16 is shifted according to the above-indicated shifting map, to immediately select the above-described first speed ratio value γ1at. Namely, the drivability of the vehicle 8 can be improved.

The present embodiment is further configured such that the speed ratio selection control means 80 implements the speed ratio selection control such that the engine 12 is switched from the above-indicated NA state to the above-indicated supercharging state by switching the waste gate valve 42 from the open state to the closed state after the moment of completion of the shifting action of the automatic transmission 16 to the second shift position SH02 and before the moment of initiation of the shifting action of the automatic transmission 16 from the second shift position SH02 to the first shift position SH01. Accordingly, it is possible to shift the automatic transmission 16 to the speed position according to the above-described shifting map, that is, to the first shift position SH01, while reducing the degree of delay of the operating response of the supercharger 20 as recognized by the vehicle operator.

The present embodiment is also configured such that the speed ratio selection control means 80 implements the above-described speed ratio selection control such that the automatic transmission 16 which has been shifted to the above-described second shift position SH02, namely, to select the second speed ratio value γ2at is shifted to the first shift position SH01, namely, to select the above-described first speed ratio value γ1at when the above-indicated predetermined waiting time TIMEs has expired after the moment of completion of the shifting action of the automatic transmission 16 to the second shift position SH02. Accordingly, the automatic transmission 16 is only temporarily placed in the second shift position SH02, and is eventually shifted to the speed position according to the above-described shifting map, making it possible to assure fuel economy of the vehicle 8 almost equal to that in the case of the normal shifting action according to the shifting map. Further, the automatic transmission 16 is shifted to select the first speed ratio value γ1at a suitable length of time after the speed ratio γat is changed to the second speed ratio value γ2at, making it possible to minimize a possibility that the vehicle operator feels frequent shifting actions of the automatic transmission 16. Further, it is possible to allow the supercharger 20 to raise the pressure of the intake air before the automatic transmission 16 is shifted to select the first speed ratio value γ1at after selection of the second speed ratio value γ2at. Accordingly, it is possible to improve the operating response of the engine 12 when the speed ratio is changed from the second speed ratio value γ2at to the first speed ratio value γ1at.

The present embodiment is further configured such that the second speed position SH02 of the automatic transmission 16 which has the second speed ratio value γ2at is the highest-gear position of the speed positions in which the engine 12 is kept in the above-indicated NA state (second operating state). Accordingly, a difference between the first speed ratio value γ1at and the second speed ratio value γ2at is not considerably large, so that it is possible to minimize a possibility that the vehicle operator feels uneasy about the shifting action of the automatic transmission 16 to temporarily establish the second shift position SH02. It is also possible to minimize deterioration of the fuel economy due to the shifting action of the automatic transmission 16 to temporarily establish the second shift position SH02, without following the above-indicated shifting map.

The present embodiment is also configured such that the speed ratio selection control means 80 implements the above-described speed ratio selection control such that when the automatic transmission 16 which has been shifted to select the second shift position SH02 is shifted to the first shift position SH01, the waste gate valve 42 is switched from the open state to the closed state to switch the engine 12 from the above-indicated NA state to the above-indicated supercharging state before the operating point of the engine 12 in the engine operation map has moved from the above-indicated NA region into the above-indicated supercharging region. Accordingly, the pressure of the intake air is raised by the supercharger 20 before the moment of completion of the shifting action from the second shift position SH02 to the first shift position SH01, so that the operating response of the engine 12 can be improved.

The present embodiment is further configured such that the supercharger 20 is a turbocharger driven by the exhaust emission from the engine 12. Where the turbocharger is provided to place the engine 12 in the supercharging state, the operating response of the engine 12 is considerably delayed upon switching of the engine 12 from the above-indicated NA state to the above-indicated supercharging state. Although the vehicle 8 is provided with the turbocharger, the present embodiment makes it possible to effectively improve the response of the vehicle 8 to an operation of the accelerator pedal 54 by the vehicle operator to accelerate the vehicle 8.

While the embodiment of the present invention has been described in detail by reference to the drawings, it is to be understood that the invention may be otherwise embodied.

Although the shifting map used in the illustrated embodiment for controlling the shifting actions of the automatic transmission 16 consists of shifting lines in the form of predetermined shift-up lines and shift-down lines, the use of the shifting lines as the shifting map is not essential.

While the shifting map used in the illustrated embodiment uses the vehicle running speed V and the accelerator pedal operation amount Acc as control parameters, other physical quantities may be used as the control parameters. Further, only one control parameter or three or more control parameters may be used for the shifting map.

Although the vehicle 8 according to the illustrated embodiment is of an FR type vehicle, as shown in FIG. 1, the vehicle may be of an FF (front-engine front-drive) type vehicle, or a 4-wheel drive vehicle.

In the illustrated embodiment, the torque converter 14 is interposed between the engine 12 and the automatic transmission 16, as shown in FIG. 1. However, the vehicle 8 need not be provided with the torque converter 14.

In the illustrated embodiment, the automatic transmission 16 is a step-variable transmission having six forward drive speed positions. However, the automatic transmission may have more than or less than six forward drive speed positions. Further, the automatic transmission 16 may be replaced by a continuously variable transmission (CVT) the speed ratio of which is continuously variable.

While the control operation illustrated in the flow chart of FIG. 4 according to the illustrated embodiment includes SA7-SA9, the control operation need not include SA7-SA9.

Although the supercharger 20 provided in the illustrated embodiment is a turbocharger, a mechanical type supercharger which is driven by the output shaft of the engine 12. Where the mechanical type supercharger is used, the exhaust bypass passage 40 and the waste gate valve 42 are not provided, but a clutch is disposed to selectively connect the output shaft of the engine 12 and the drive shaft of the supercharger, so that the clutch functions as an engine-state switching device for switching the engine 12 between the above-indicated supercharging state and the NA state.

The above-described speed ratio selection control according to the illustrated embodiment is implemented to shift the automatic transmission 16 from the once established second shift position SH02 to the first shift position SH01 such that the shifting action to the first shift position SH01 is performed the above-indicated waiting time TIMEs after the moment of completion of the shifting action to the second shift position SH02. The moment of expiration of this waiting time TIMEs may be the moment of initiation of the shifting action to the first speed position SH01, or the moment of termination of the shifting action to the first shift position SH01. The length of the waiting time TIMEs is determined depending upon whether the moment of expiration of the waiting time TIMEs is the moment of initiation or termination of the shifting action to the first shift position SH01.

According to the control operation illustrated in the flow chart of FIG. 4 of the above-described embodiment, the determination as to whether the waiting time TIMEs has expired or not is made in SA8, and the control flow goes to SA9 when the waiting time TIMEs has expired, to initiate the shift-up action of the automatic transmission 16 from the second shift position SH02 to the first shift position SH01. However, the moment of initiation of the shift-up action in SA9 may be determined on the basis of the amount of rise of the intake air pressure in the supercharger 20.

It is to be understood that the foregoing embodiment and modifications have been described for illustrative purpose only, and that the present invention may be embodied with various other changes and improvements which may occur to those skilled in the art.

NOMENCLATURE OF REFERENCE SIGNS

8: Vehicle
10: Vehicular drive system
12: engine
16: Automatic transmission
20: Supercharger
22: Drive wheels
42: Waste gate valve (engine operation switching device)
50: Electronic control device (Control device)

The invention claimed is:

1. A control device for a drive device of a vehicle which is provided with an engine, a supercharger to raise a pressure of intake air introduced in said engine, an accelerating member manually operable by an operator of the vehicle to accelerate the vehicle, and an automatic transmission constituting a portion of a power transmitting path between said engine and drive wheels, and wherein said engine is placed in a first operating state in which said supercharger is operated, or a second operating state in which an operation of said supercharger is restricted as compared with that in said first operating state, said control device comprising:
   a speed ratio selection control portion configured to implement a speed ratio selection control to change a method of selecting a speed ratio of said automatic transmission depending upon a rate of increase of an operation amount of said accelerating member, where said engine will be placed in said first operating state if said automatic transmission is shifted to select a first speed ratio value according to a predetermined shifting map while said engine is placed in said second operating state,
   said speed ratio selection control portion implementing said speed ratio selection control to shift said automatic transmission to select said first speed ratio value when the rate of increase of the operation amount of said accelerating member is relatively low, and to shift said automatic transmission to select a second speed ratio value at which said engine is kept in said second operating state and which is higher than said first speed ratio value, when the rate of increase of the operation amount of said accelerating member is relatively high.

2. The control device according to claim 1, wherein said speed ratio selection control portion implements said speed ratio selection control such that said automatic transmission which has been shifted to select said first speed ratio value is shifted to select said first speed ratio value,
   said speed ratio selection control portion switching said engine from said second operating state to said first operating state after a moment of completion of a shifting action of said automatic transmission to select said second speed ratio value and before a moment of initiation of a shifting action of the automatic transmission from said second speed ratio value to select said first speed ratio value.

3. The control device according to claim 1, wherein said speed ratio selection control portion implements said speed ratio selection control such that said automatic transmission which has been shifted to select said second speed ratio value is shifted to select said first speed ratio value after a predetermined waiting time has expired from a moment of completion of a shifting action of said automatic transmission to select said second speed ratio value.

4. The control device according to claim 1, wherein said automatic transmission is a step-variable transmission, and a speed position of said automatic transmission which has said second speed ratio value is a highest-gear position of speed positions in which said engine is kept in said second operating state.

5. The control device according to claim 2, wherein said vehicle is provided with an engine operation switching device configured to switch said engine between said first operating state and said second operating state,
   the control device includes a memory which stores a predetermined engine operation map which is divided into a first operating region in which said engine is placed in said first operating state and a second operating region in which said engine is placed in said second operating state,
   said speed ratio selection control portion implements said speed ratio selection control such that when said automatic transmission which has been shifted to select said second speed ratio value is shifted to select said first speed ratio value, said engine is switched to said first operating state by said engine operation switching device before an operating point of said engine in said engine operation map has moved from said second operating region into said first operating region.

6. The control device according to claim 1, wherein said supercharger is a turbocharger driven by an exhaust emission from said engine.

* * * * *